US007173267B2

(12) United States Patent
Nakano

(10) Patent No.: US 7,173,267 B2
(45) Date of Patent: Feb. 6, 2007

(54) EXTREME ULTRA VIOLET LIGHT SOURCE DEVICE

(75) Inventor: Masaki Nakano, Yokohama (JP)

(73) Assignees: Komatsu Ltd., Tokyo (JP); Gigphoton Inc., Tokyo (JP)

( * ) Notice: Subject to any disclaimer, the term of this patent is extended or adjusted under 35 U.S.C. 154(b) by 0 days.

(21) Appl. No.: 11/341,636

(22) Filed: Jan. 30, 2006

(65) Prior Publication Data

US 2006/0176925 A1 Aug. 10, 2006

(30) Foreign Application Priority Data

Feb. 4, 2005 (JP) ............................ 2005-028336

(51) Int. Cl.
*G01J 1/00* (2006.01)

(52) U.S. Cl. .................................................. 250/504 R

(58) Field of Classification Search ............ 250/504 R, 250/493.1

See application file for complete search history.

(56) References Cited

U.S. PATENT DOCUMENTS

2006/0192154 A1* 8/2006 Algots et al. ........... 250/504 R
2006/0193997 A1* 8/2006 Bykanov .................... 427/585

FOREIGN PATENT DOCUMENTS

JP 2004-6365 1/2004
JP 2004-31342 1/2004
JP 2004-111907 4/2004

OTHER PUBLICATIONS

H.M. Hertz et al., entitled "Debris Free Soft X-Ray Generation Using a Liquid Droplet Laser Plasma Target", SPIE, vol. 2523, pp. 88-93.

U. Schwenn et al., entitled "*A Continuous Droplet Source for Plasma Production with Pulse Lasers*", Journal of Physics E: Scientific Instruments, vol. 7, 1974, pp. 715-718.

* cited by examiner

*Primary Examiner*—Kiet T. Nguyen
(74) *Attorney, Agent, or Firm*—Wenderoth, Lind & Ponack, L.L.P.

(57) ABSTRACT

An LPP EUV light source device for forming a uniform droplet target regardless of a frequency of a drive signal applied to a vibrator. The LPP EUV light source device includes: a chamber in which the extreme ultra violet light is generated; an injection nozzle that injects a target material into the chamber; a vibrator that has two terminals and vibrates to provide vibration to the injection nozzle when a drive signal is applied between the two terminals via a cable; a voltage generator that generates the drive signal; a controller that monitors a voltage between the two terminals of the vibrator and feedback controls the voltage generator such that an amplitude of the monitored voltage falls within a predetermined range; and a laser source that generates a laser beam to be irradiated to the target material injected from the injection nozzle.

10 Claims, 5 Drawing Sheets

EXTREME ULTRA VIOLET LIGHT SOURCE DEVICE

BACKGROUND OF THE INVENTION

1. Field of the Invention

The present invention relates to an LPP (laser produced plasma) extreme ultra violet (EUV) light source device for generating extreme ultra violet light to be used for exposing semiconductor wafers or the like.

2. Description of a Related Art

As semiconductor processes become finer, the photolithography has been making rapid progress to finer fabrication, and, in the next generation, microfabrication of 100 nm to 70 nm, further, microfabrication of 50 nm or less will be required. For example, in order to fulfill the requirement for microfabrication of 50 nm or less, the development of exposure equipment with a combination of an EUV light source of about 13 nm in wavelength and a reduced projection cataoptric system is expected.

As the EUV light source, there are three kinds of an LPP (laser produced plasma) type using plasma generated by irradiating a laser beam to a target, a DPP (discharge produced plasma) type using plasma generated by discharge, an SR (synchrotron radiation) type using orbital radiation. Among them, the LPP light source has advantages that extremely high intensity near black body radiation can be obtained because plasma density can be considerably made large, light emission of only the necessary waveband can be performed by selecting the target material, and an extremely large collection solid angle of $2\pi$ sterad can be ensured because the light source is a point source having substantially isotropic angle distribution and there is no structure such as electrodes surrounding the light source. Accordingly, the LPP EUV light source device is thought to be predominant as a light source for EUV lithography requiring power of several tens of watts.

In the LPP EUV light source, EUV light is generated in the following manner. A target material such as xenon (Xe) is injected by using an injection nozzle into a chamber (vacuum chamber) provided with a vacuum pump. When a laser beam outputted from a laser located outside of the chamber is collected and irradiated to the target, the target turns into plasma and EUV light near 13.5 nm is generated from the plasma.

As the state of the target material, although any one of gas, liquid and solid can be used, a liquid target is thought to be advantageous considering that it is better in EUV light generation efficiency than gas and it is less likely to contaminate the interior of the chamber than solid. Further, as methods of injecting the liquid target, there are a method of forming jets by continuously injecting the target material from the injection nozzle and a method of forming droplets by injecting the target material from the injection nozzle at predetermined intervals. The latter case has advantages that the EUV light generation efficiency can be increased by timing the dropping intervals of droplets and irradiation intervals of laser beams and the contamination within the chamber can be suppressed by reducing waste target materials that are not turned into plasma.

As a method of forming a target of droplets, there is a continuous jet method of providing vibration to an injection nozzle for injecting jets at predetermined intervals. In the LPP EUV light source adopting the method, a vibrator for providing vibration to the injection nozzle is provided. H. M. Hertz et al., "Debris free soft x ray generation using a liquid droplet laser plasma target", U.S., SPIE, Vol. 2523, pp.

88–93 discloses a structure employing a piezoelectric element as a vibrator. U. Schwenn et al., "A continuous droplet source for plasma production with pulse lasers", U.K., Journal of physics E: Scientific Instruments, Vol. 7, 1974, pp. 715–718 discloses a structure employing a magnetic coil as a vibrator.

Further, Japanese Patent Application Publication JP-P2004-6365A discloses an injection nozzle for extreme ultra violet light source wherein the injection nozzle includes a target material chamber having an orifice for ejecting a stream of droplets of a target material from the orifice, and a drift chamber consistent with the orifice and for receiving the stream of droplets, the drift chamber being formed with a drift chamber opening having a predetermined length for tolerating the freeze of the droplets when the droplets propagate through the drift chamber and located oppositely to the target material chamber so as to discharge the droplets therethrough.

Further, Japanese Patent Application Publication JP-P2004-31342A discloses a laser plasma extreme ultra violet radiation source including an injection nozzle having a supply source end and an outlet end with an orifice having a predetermined diameter for ejecting a stream of droplets of a target material, a target material excitation source for supplying a pulsating excitation signal to the injection nozzle, and a laser source for supplying a pulsating laser beam, wherein the pulsating timing of the excitation source, the diameter of the orifice and the pulsating timing of the laser source are designed with respect to one another so that the droplets ejecting from the orifice of the injection nozzle have a predetermined speed and an interval between droplets and the target droplets within the droplet stream are ionized by the pulse of the laser beam, and wherein a predetermined number of buffer droplets are supplied between the target droplets so as not to be directly ionized by the pulsing laser beam and the buffer droplets absorb plasma energy radiated from the ionized target droplets so that subsequent target droplets are not affected by the ionization of the precedent target droplets.

Furthermore, Japanese Patent Application Publication JP-P2004-111907A discloses an extreme ultra violet light source including a droplet generator for generating a stream of droplets along an initial path, a steering device for deflecting the droplets from the initial path to a target path, a sensor for detecting the location of the stream of droplets, and an actuator for causing the droplets to be deflected to a target location in the target path by changing the orientation of the steering plate in response to a signal from the sensor.

By the way, in the LPP EUV light source device, it is necessary to form uniform droplets for stable EUV light generation. Here, "uniform" means a state of droplets, after the jet injected from the injection nozzle is divided into droplets, where sizes and shapes of the respective droplets, an interval between adjacent two droplets, etc. are uniform and no satellites are formed near the irradiation position of the pulse laser beam. The satellites refer to minute droplets formed in front and back of the major droplets when the jet injected from the injection nozzle is divided into droplets.

For this purpose, vibration must be provided with appropriate amplitude and frequency to the vibrator for providing vibration to the injection nozzle. However, no mechanism has been disclosed for forming droplets in consideration of amplitude and frequency of the vibrator.

FIG. 9 is a schematic diagram showing a general structure of a droplet generation injection nozzle. The droplet generation injection nozzle includes an injection nozzle 1 for injecting a target material and a vibrator 2 for providing vibration to the injection nozzle 1. A pipe 3 for supplying the target material to the injection nozzle 1 is provided to the injection nozzle 1. Further, a vibrator power supply 4 for generating a voltage applied to the vibrator is connected to two terminals 2*a* and 2*b* of the vibrator 2. The vibrator 2 is supported by a supporting part 5 fixed to a vacuum chamber.

The vibrator 2 used for forming droplets itself has a capacitance component (C) and an inductance (L), and operates as one element of an electric circuit as shown in FIG. 9. Such an element is connected to a cable and incorporated within an EUV light source device, and therefore, the vibrator is affected by a wiring capacity, a wiring inductance, etc. On this account, the magnitude of the voltage actually applied to the vibrator 2 changes from the magnitude of the voltage set in the vibrator power supply 4 according to the frequency of the voltage. Thereby, the vibration amplitude of the vibrator 2 dependent on the voltage value also changes.

Thus, when the frequency of the voltage applied to the vibrator is changed, the voltage applied between terminals of the vibrator, i.e., the vibration amplitude of the vibrator varies. Accordingly, there has been a problem that droplets in desired sizes at uniform intervals can not be obtained. Especially, in a piezoelectric element or the like as the vibrator having resonant frequency in high frequency bands, variation is large in the applied voltage around the resonant frequency, which becomes one of main factors inhibiting the generation of uniform droplets. Further, excessive injection nozzle vibration due to resonance is also generated around the resonant frequency band of the entire droplet injection nozzle including the vibrator, and therefore, the generation of uniform droplets is inhibited.

SUMMARY OF THE INVENTION

The present invention has been achieved in view of the above described problems. An object of the present invention is to form a uniform droplet target regardless of the frequency of a drive signal applied to a vibrator in an LPP EUV light source device.

In order to achieve the above object, an extreme ultra violet light source device according to a first aspect of the present invention is a light source device for generating extreme ultra violet light by irradiating a laser beam to droplets as a target formed by a continuous jet method, and the device includes: a chamber in which the extreme ultra violet light is generated; an injection nozzle that injects a target material into the chamber; a vibrator that has two terminals and vibrates to provide vibration to the injection nozzle when a drive signal is applied between the two terminals via a cable; a voltage generator that generates the drive signal to be applied between the two terminals of the vibrator; a controller that monitors a voltage between the two terminals of the vibrator and feedback controls the voltage generator such that an amplitude of the monitored voltage falls within a predetermined range; and a laser source that generates a laser beam to be irradiated to the target material injected from the injection nozzle.

Further, an extreme ultra violet light source device according to a second aspect of the present invention is a light source device for generating extreme ultra violet light by irradiating a laser beam to droplets as a target formed by a continuous jet method, and the device includes: a chamber in which the extreme ultra violet light is generated; an injection nozzle that injects a target material into the chamber; a vibrator that has two terminals and vibrates to provide vibration to the injection nozzle when a drive signal is applied between the two terminals via a cable; a voltage generator that generates the drive signal to be applied between the two terminals of the vibrator; a measuring unit that measures an amount of displacement of the injection nozzle or the vibrator; a controller that feedback controls the voltage generator based on the amount of the displacement measured by the measuring unit such that an amplitude of the vibration provided to the injection nozzle falls within a predetermined range; and a laser source that generates a laser beam to be irradiated to the target material injected from the injection nozzle.

According to the present invention, the voltage generator is feedback controlled while the amplitude of the voltage between the terminals of the vibrator or the amount of the displacement (vibration amplitude) of the injection nozzle or the vibrator is monitored such that the amplitude falls within a predetermined range, and therefore, the injection nozzle can be vibrated with an appropriate amplitude according to the vibration frequency. Thereby, uniform droplets can be formed regardless of the vibration frequency, and EUV light can be generated efficiently and stably in the LPP EUV light source device. Further, since various droplet formation conditions are easily accommodated, devices having a wide range of performance can be provided at low prices. Furthermore, since the defects such as breakage and failure of the vibrator can be promptly detected by directly measuring the voltage between terminals of the vibrator, the vibrator amplitude or the injection nozzle amplitude, the reliability of the LPP EUV light source device can be improved.

DESCRIPTION OF THE PREFERRED EMBODIMENTS

Figure 1:
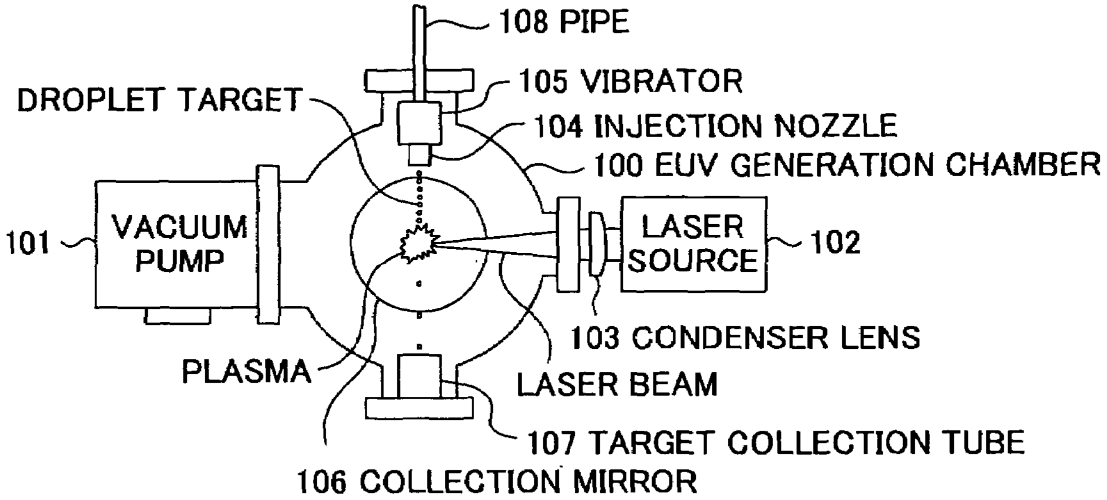
FIG. 1 is a schematic diagram showing an outline of an LPP extreme ultra violet light source device according to the first to sixth embodiments of the present invention.

Hereinafter, preferred embodiments of the present invention will be described in detail by referring to the drawings. The same reference numerals are assigned to the same component elements and the description thereof will be omitted.

FIG. 1 is a schematic diagram showing an outline of an LPP extreme ultra violet (EUV) light source device according to the first to sixth embodiments of the present invention. This EUV light source device includes an EUV generation chamber (vacuum chamber) 100, a vacuum pump 101, a laser source 102, a condenser lens 103, an injection nozzle 104, a vibrator 105, a collection mirror 106, and a target collection tube 107.

The vacuum pump 101 keeps the EUV generation chamber 100 at predetermined degree of vacuum by exhausting the air within the chamber. Further, the laser source 102 is provided outside of the EUV generation chamber 100 and emits a laser beam to be irradiated to a target material. The condenser lens 103 collects the laser beam emitted from the laser source 102 and guides the beam to a predetermined position (target position) within the EUV generation chamber 100.

The injection nozzle 104 injects a target material. Further, the vibrator 105 is attached to the injection nozzle 104 for providing vibration to the injection nozzle 104.

In this EUV light source device, a droplet target is used as a target, and the continuous jet method is adopted as a method of forming droplets. That is, when the target material is injected from the injection nozzle 104, vibration with predetermined frequency and amplitude is provided to the injection nozzle 104 by the vibrator 105. Thereby, the vibration propagates to the target material injected from the injection nozzle 104 to form droplets of the target material.

When the laser beam emitted from the laser source 102 and passed through the condenser lens 103 is irradiated to thus formed droplet target, the target material turns into plasma. EUV light near 13.5 nm is generated from thus generated plasma. The EUV light is collected by the collection mirror 106 and guided into a desired direction. Further, the residual target material that has not turned into plasma is collected by the target collection tube 107.

Figure 2:
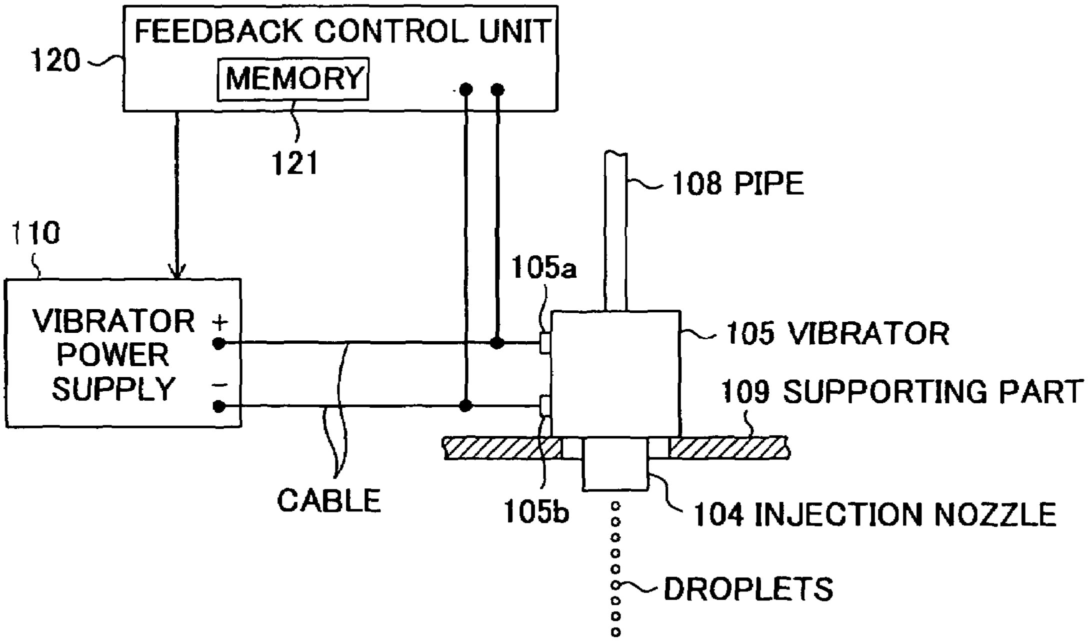
FIG. 2 is a schematic diagram showing a part of the LPP extreme ultra violet light source device according to the first embodiment of the present invention.

FIG. 2 is a schematic diagram showing a part of the LPP extreme ultra violet light source device according to the first embodiment of the present invention, and shows the constitution of the injection nozzle 104 and vibrator 105 as shown in FIG. 1 in detail.

As shown in FIG. 2, the injection nozzle 104 is provided with a pipe 108 for supplying the target material to the injection nozzle 104. Further, the vibrator 105 is supported by a supporting part 109 fixed to the EUV generation chamber 100 (FIG. 1). The vibrator 105 is provided with two terminals **105*a* and 105*b*, and a vibrator power supply (voltage generator) 110 for generating a drive signal having a predetermined frequency to supply a voltage of the drive signal to the vibrator is connected to these terminals 105*a* and 105*b* via a cable. Furthermore, a feedback control unit 120 for feedback controlling the output voltage of the vibrator power supply 110 is provided to the vibrator power supply 110**.

In the embodiment, a liquid target material is used as the target. Specifically, a material in a liquid state at normal temperature such as water, ethanol, methanol or the like, a material in which fine particles of tin (Sn) or tin oxide are dispersed in the liquid in a colloidal state, and a material in which lithium (Li), lithium fluoride (LiF), lithium chloride (LiCl) or the like is solved in the liquid can be used. Further, a liquid obtained by heating and melting a material in a solid state at normal temperature such as tin or lithium can be also used. In this case, a mechanism for heating the solid target material is provided in the middle of the pipe 108. Furthermore, a liquid liquefied by cooling and pressurizing a material in a gas state at normal temperature such as Xenon (Xe) can be also used. In this case, a mechanism for cooling the Xenon gas or the like at high pressure is provided in the middle of the pipe 108.

Such target material is injected under pressure of several MPa in the injection nozzle 104 such that a predetermined speed is obtained after the material is injected from the nozzle. Thus injected target material from the injection nozzle 104 normally forms a continuous fluid jet.

The vibrator 105 is attached to the injection nozzle 104 for propagation of vibration, and vibrates at a frequency of the drive signal and with an amplitude according to the voltage of the drive signal applied between the terminal **105*a* and terminal 105*b* (voltage between terminals). As the vibrator 105, a piezoelectric element, magnetic coil or the like that vibrates when applied with a voltage is used. When the droplet target is formed, the target material is injected from the injection nozzle 104, and the voltage is applied between the terminals 105*a* and 105*b* by the vibrator power supply 110 to vibrate the vibrator 105**. Thereby, vibration propagates to the jet surface of the target material. In the case where the vibration has appropriate frequency and amplitude, uniform droplets are formed. For detailed structure of the droplet injection nozzles using the piezoelectric element and magnetic coil, refer to the above described documents: H. M. Hertz et al., "Debris free soft x ray generation using a liquid droplet laser plasma target" and U. Schwenn et al, "A continuous droplet source for plasma production with pulse lasers", respectively.

The feedback control unit 120 monitors the voltage between terminals and feedback controls the output voltage of the vibrator power supply 110 based on the monitored amplitude of the voltage to maintain the amplitude of the voltage between terminals within a predetermined range (a range in which uniform droplets can be formed). For example, the feedback control unit 120 has a nonvolatile memory 121 in which a database representing amplitude ranges of the voltage, which enable formation of uniform droplets and which are set according to frequencies of the drive signal, has been stored. And, the feedback control unit 120 controls the vibrator power supply 110 based on the database such that the amplitude of the monitored voltage between terminals falls within one of the above amplitude ranges selected according to the frequency of the applied drive signal.

Here, the reason for providing the feedback control unit 120 to the vibrator power supply 110 in the embodiment will be described.

In order to form uniform droplets by the continuous jet method, the frequency of vibration provided to a jet should be determined according to the diameter (i.e., injection nozzle diameter) and speed of the jet injected from the injection nozzle. For example, in the case where a jet is injected at a speed of 30 m/s from a injection nozzle having a diameter of 50 μm, in order to form uniform droplets, the vibrator is required to be vibrated in a range from 80 kHz to 200 kHz. Further, the vibration amplitude of the vibrator required for uniform droplet generation is determined according to the frequency. That is, the range of the vibrator amplitude enabling formation of uniform droplets varies according to the frequency. Since sometimes the amplitude range becomes such narrow that a ratio between the minimum value and the maximum value is about tenfold, it is necessary to control the amplitude with high precision.

Here, when the vibrator amplitude becomes less than the minimum value of the appropriate range, nonuniform droplets are formed due to natural disturbance of the jet. Contrary, when he vibrator amplitude becomes more than the maximum value of the appropriate range, satellites (minute droplets formed between desired droplets) are produced, or droplets are united. However, when the droplets are nonuniform, the interaction between the respective droplets and a laser also becomes nonuniform, and thereby, the obtained EUV light as a result becomes extremely unstable. Further, since the laser beam is not irradiated to the satellites basically, the target materials that do not make any contribution to the EUV light generation are inputted into the chamber. Thereby, increase in burden on the exhaust pump and decrease in EUV output due to rise of internal pressure of the high vacuum chamber are caused. Furthermore, also in the case where droplets are united, since they are united not by control, droplets in irregular shapes and intervals are formed. Accordingly, the interaction between the individual droplets and the laser varies and the obtained EUV light as a result becomes extremely unstable as is the case where nonuniform droplets are formed due to natural disturbance.

Therefore, in order to form uniform droplets, it is necessary to control the vibrator amplitude to fall within the predetermined range according to the vibration frequency. Further, for suppressing excessive consumption current in the power supply, it is desirable that the voltage is applied so as to vibrate the vibrator with the minimum amplitude.

Figure 3:
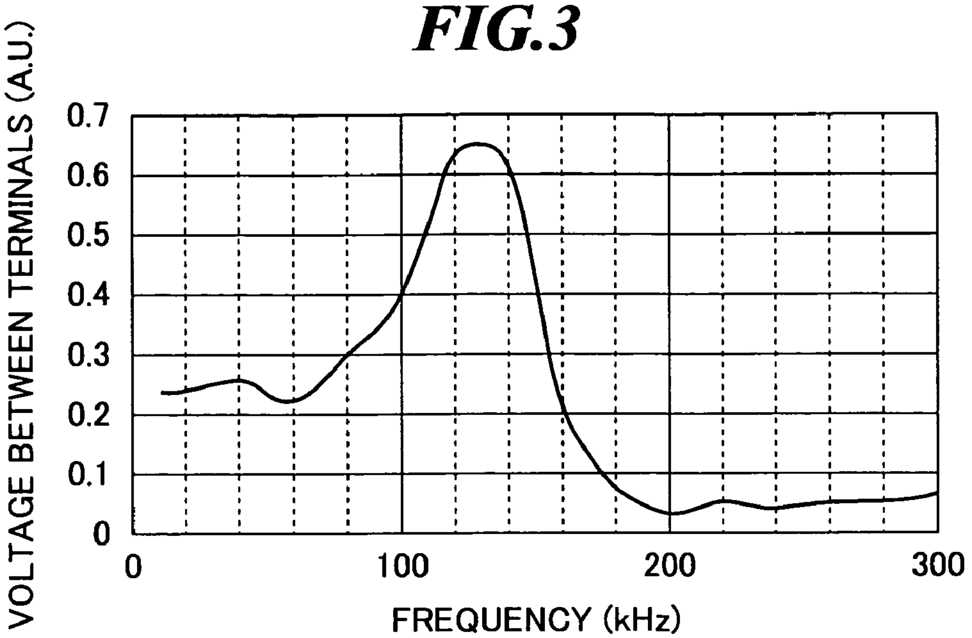
FIG. 3 is a graph showing variation in amplitude of a voltage between terminals of a vibrator according to a frequency of a supplied drive signal.

FIG. 3 is a graph showing variation in amplitude of the voltage between terminals of a vibrator according to the frequency of a supplied drive signal in the case where a piezoelectric element as the vibrator is connected to a cable and incorporated in the EUV light source device. In FIG. 3, the horizontal axis indicates the frequency of the drive signal and the vertical axis indicates a value (absolute unit: A. U.) obtained by normalizing the monitored value of the amplitude of the voltage between terminals.

In FIG. 3, the amplitude of the output voltage of the vibrator power supply is set to 0.25 (A.U.) in the low frequency band. However, when the frequency is varied in a range from 10 kHz to 300 kHz, although the set voltage is the same, the applied voltage (monitored value) varies more than tenfold. Especially, in the range from 80 kHz to 160 kHz, the amplitude drastically varies.

Thus, since the voltage actually applied to the vibrator incorporated in the circuit is affected by the impedance of the cable, it does not necessarily agree with the output voltage that has been set in the vibrator power supply. Accordingly, when the frequency is changed without adjusting the amplitude of the set voltage, the vibrator vibrates with excessive amplitude, or contrary, vibrates with insufficient amplitude. Thereby, the amplitude provided to the jet becomes excessive or insufficient, and uniform droplets can not be formed. Further, in the case where the vibrator breaks, there is no means for confirming the breakage, and therefore, a problem also arises that the downtime of the EUV light source device becomes longer.

On this account, in the embodiment, as shown in FIG. 1, the feedback control unit 120 is provided to output the voltage from the vibrator power supply 110 while monitoring the voltage between terminals of the vibrator 105 and adjust the output voltage of the vibrator power supply 110 based on the monitored value of the voltage between terminals. Thereby, even in the case where the frequency of the drive signal is changed, the variation in amplitude of the voltage between terminals of the vibrator 105 can be suppressed and the shift from the appropriate range can be promptly corrected. As a result, the vibrator can be vibrated with appropriate amplitude regardless of the frequency band. Therefore, the amplitude of the injection nozzle that directly affects the formation of uniform droplets can be maintained within the appropriate range, and uniform droplets can be formed at each frequency band.

Figure 4:
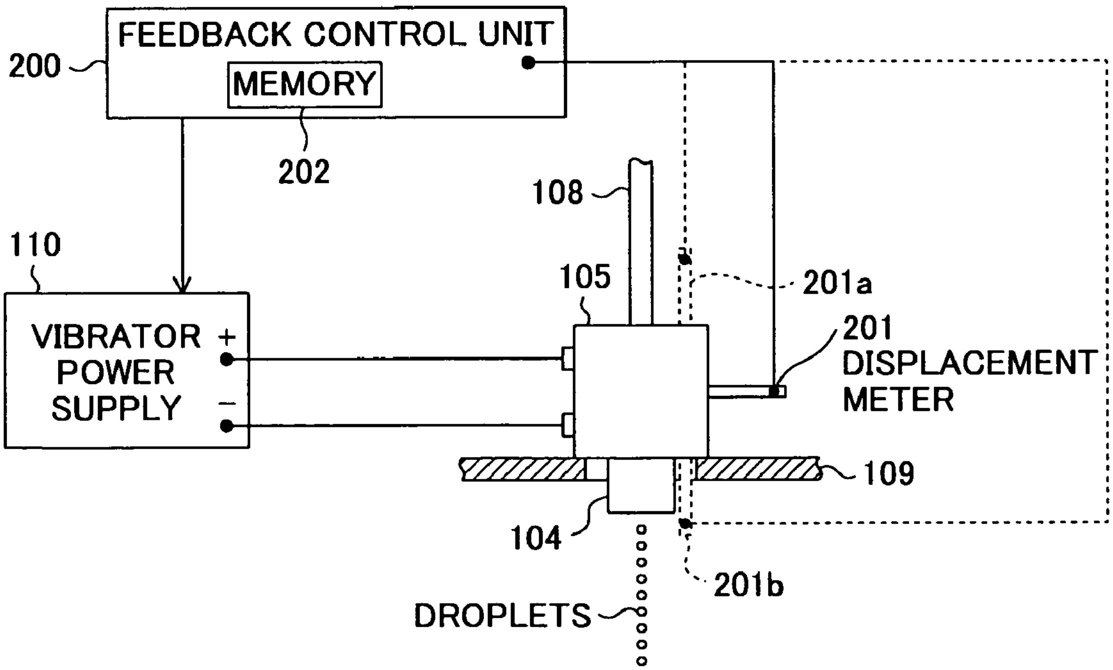
FIG. 4 is a schematic diagram showing a part of the LPP extreme ultra violet light source device according to the second embodiment of the present invention.

FIG. 4 is a schematic diagram showing a part of the LPP extreme ultra violet light source device according to the second embodiment of the present invention. This LPPEUV light source device has a feedback control unit 200 in place of the feedback control unit 120 shown in FIG. 2, and further has at least one contact-type displacement meter (displacement gage) 201 as a measuring unit attached to the vibrator 105. Other constitution is the same as that of the LPP EUV light source device shown in FIGS. 1 and 2.

The displacement meter 201 is provided for measuring the amount of displacement of the vibrator 105. Further, the feedback control unit 200 feedback controls the output voltage of the vibrator power supply 110 based on the amount of displacement measured by the displacement meter 201 such that the vibrator 105 vibrates with desired amplitude (amplitude in a range in which uniform droplets can be formed). For example, the feedback control unit 200 has a nonvolatile memory 202 in which a database representing amplitude ranges of the vibration, which enable formation of uniform droplets and which are set according to frequencies of the drive signal, has been stored. And, the feedback control unit 200 controls the vibrator power supply 110 based on the database such that the measured amplitude of the vibration of the vibrator 105 falls within one of the above amplitude ranges.

In FIG. 4, the displacement meter 201 is attached to the side of the vibrator 105, however, the attachment position of the displacement meter 201 is not limited to the position. For example, in the case where the vibrator 105 vibrates in horizontal directions of FIG. 4, it is desirably attached to the side of the vibrator 105. Further, in the case where the vibrator 105 vibrates in vertical directions of FIG. 4, it is desirably attached to the upper part (position of the displacement meter 201*a*) or the lower part (position of the displacement meter 201*b*) of the vibrator 105.

Further, as a manner in which the displacement meter 201 is attached to the vibrator 105, the vibrator 105 may be attached with the vibrator itself pressed against the vibrator 105, or the measurement terminal part of the displacement meter 201 is bonded to the vibrator 105, as long as a correct amount of displacement can be measured. Note that it is important to prevent the pressing force, weight or the like of the displacement meter 201 from affecting the displacement of the vibrator as far as possible.

According to the embodiment, since the vibrator amplitude is directly monitored, variation in the vibrator amplitude caused by variation in the voltage between terminals generated when the frequency of the drive signal is changed can be corrected more precisely. Thereby, the vibrator can be vibrated with appropriate amplitude according to the frequency, and uniform droplets can be formed at each frequency. Further, by monitoring the vibration amplitude of the vibrator itself, the defect and breakage of the vibrator can be promptly detected, and the downtime of the EUV light source device can be made shorter.

In FIG. 4, the feedback control unit 120 has controlled the vibrator power supply 110 based on the measurement value of the one displacement meter, however, it may control the vibrator power supply 110 based on the measurement value of plural displacement meters provided in different positions.

Figure 5:
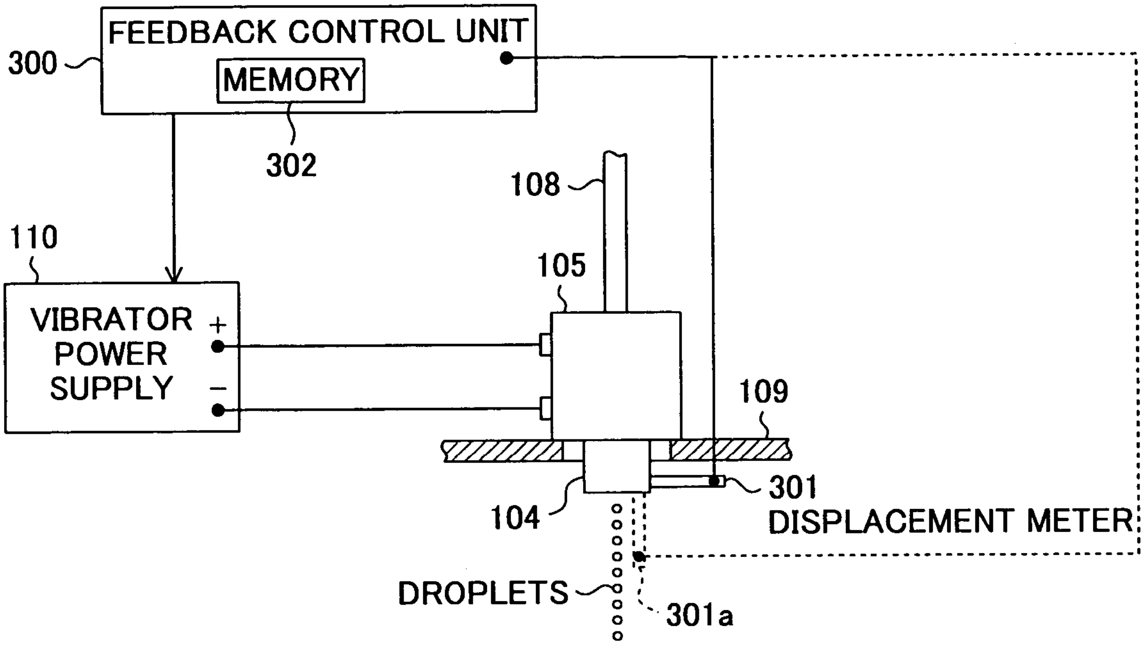
FIG. 5 is a schematic diagram showing a part of the LPP extreme ultra violet light source device according to the third embodiment of the present invention.

FIG. 5 is a schematic diagram showing a part of the LPP extreme ultra violet light source device according to the third embodiment of the present invention. This LPP EUV light source device has a feedback control unit 300 in place of the feedback control unit 120 shown in FIG. 2, and further has at least one contact-type displacement meter 301 as a measuring unit attached to the injection nozzle 104. Other constitution is the same as that of the LPP EUV light source device shown in FIGS. 1 and 2.

The displacement meter 301 is provided for measuring the amount of displacement of the injection nozzle 104. Further, the feedback control unit 300 feedback controls the output voltage of the vibrator power supply 110 based on the amount of displacement measured by the displacement meter 301 such that the injection nozzle 104 vibrates with desired amplitude (amplitude in a range in which uniform droplets can be formed). For example, the feedback control unit 300 has a nonvolatile memory 302 in which a database representing amplitude ranges of the vibration, which enable formation of uniform droplets and which are set according to frequencies of the drive signal, has been stored. And, the feedback control unit 300 controls the vibrator power supply 110 based on the database such that the measured amplitude of the vibration of the injection nozzle 104 falls within one of the above amplitude ranges.

In FIG. 5, the displacement meter 301 is attached to the side of the injection nozzle 104, however, it may be attached another position. For example, in the case where the injection nozzle 104 vibrates in horizontal directions of FIG. 5 according to the vibration direction of the vibrator 105, it is desirably attached to the side of the injection nozzle 104. Further, in the case where the injection nozzle 104 vibrates in vertical directions of FIG. 5 according to the vibration direction of the vibrator 105, it is desirably attached to the lower part (position of the displacement meter 301*a*) of the injection nozzle 104. It is not necessary to limit the attachment position of the displacement meter to the positions that have been described above, but important to dispose the displacement meter in a part where it can correctly measure the amplitude of the injection nozzle.

Further, as a manner in which the displacement meter 301 is attached to the injection nozzle 104, the injection nozzle 104 may be attached with the injection nozzle itself pressed against the injection nozzle 104, or the measurement terminal part of the displacement meter 301 is bonded to the injection nozzle 104 for measuring a correct amount of displacement. Note that it is important to prevent the pressing force, weight or the like of the displacement meter 201 from affecting the displacement of the injection nozzle as far as possible.

According to the embodiment, since the injection nozzle amplitude that directly affects the formation itself is monitored for forming uniform droplets, variation in the injection nozzle amplitude caused by variation in the voltage between terminals generated when the frequency of the drive signal is changed can be corrected more precisely. Thereby, the injection nozzle can be vibrated with appropriate amplitude according to the frequency, and uniform droplets can be formed at each frequency. Further, by monitoring the amplitude of the injection nozzle itself, the defect and breakage of the vibrator can be promptly detected, and the downtime of the EUV light source device can be made shorter.

In FIG. 5, the vibrator power supply 110 has been controlled based on the measurement value of the one displacement meter, however, the vibrator power supply 110 may be controlled based on the measurement value of plural displacement meters provided in different positions.

Figure 6:
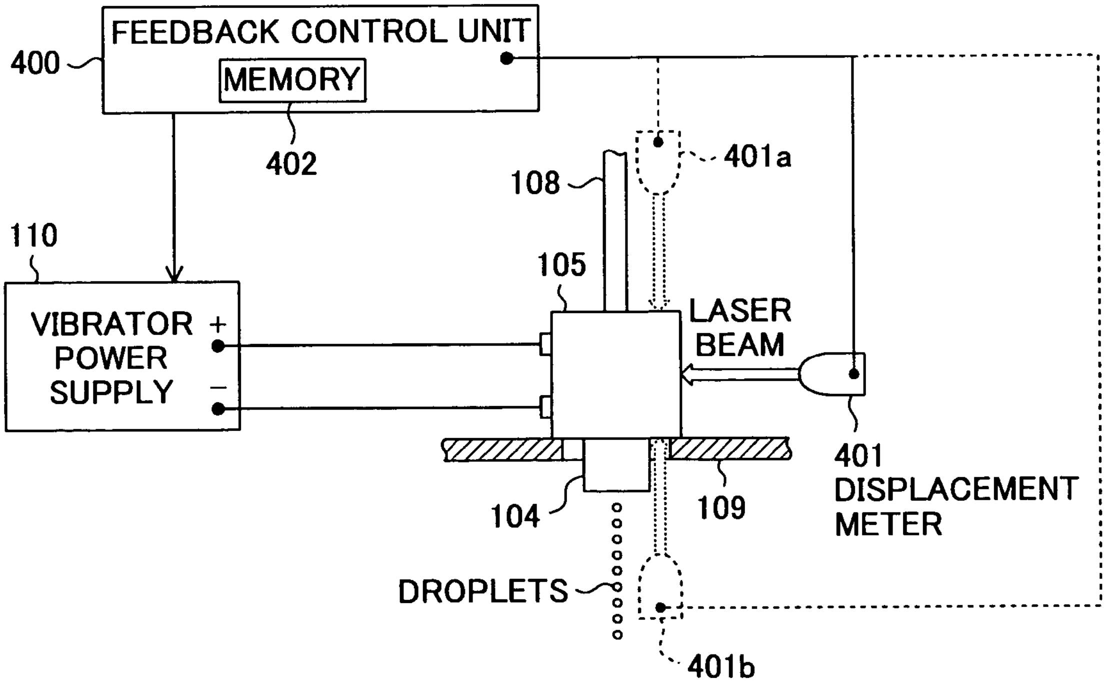
FIG. 6 is a schematic diagram showing a part of the LPP extreme ultra violet light source device according to the fourth embodiment of the present invention.

FIG. 6 is a schematic diagram showing a part of the LPP extreme ultra violet light source device according to the fourth embodiment of the present invention. This LPP EUV light source device has a feedback control unit 400 in place of the feedback control unit 120 shown in FIG. 2, and further has at least one noncontact-type displacement meter 401 as a measuring unit. Other constitution is the same as that of the LPP EUV light source device shown in FIGS. 1 and 2.

The displacement meter 401 is provided for measuring the amount of displacement of the vibrator 105. Further, the feedback control unit 400 feedback controls the output voltage of the vibrator power supply 110 based on the amount of displacement measured by the displacement meter 401 such that the vibrator 105 vibrates with desired amplitude (amplitude in a range in which uniform droplets can be formed). For example, the feedback control unit 400 has a nonvolatile memory 402 in which a database representing amplitude ranges of the vibration, which enable formation of uniform droplets and which are set according to frequencies of the drive signal, has been stored. And, the feedback control unit 400 controls the vibrator power supply 110 based on the database such that the measured amplitude of the vibration of the vibrator 105 falls within one of the above amplitude ranges.

As the noncontact-type displacement meter 401, for example, a laser Doppler displacement meter or the like may be used. The irradiation direction of laser is not limited to the direction shown in FIG. 6. For example, in the case where the vibrator 105 vibrates in horizontal directions of FIG. 6, the displacement meter 401 is desirably disposed such that a laser beam is irradiated perpendicularly to the side of the vibrator 105. Further, in the case where the vibrator 105 vibrates in vertical directions of FIG. 6, the displacement meter 401 is desirably disposed such that a laser beam is irradiated perpendicularly to the upper part or the lower part (e.g., in the position of the displacement meter 401*a* or 401*b*) of the vibrator 105.

According to the embodiment, since the vibrator amplitude is directly monitored, variation in the vibrator amplitude caused by variation in the voltage between terminals generated when the frequency of the drive signal is changed can be corrected more precisely. Thereby, the vibrator can be vibrated with appropriate amplitude according to the frequency, and uniform droplets can be formed at each frequency. Further, since the displacement of the vibrator is no longer affected by the contact with the displacement meter using the noncontact displacement meter, vibration of the vibrator can be controlled more precisely. In addition, by monitoring the vibration amplitude of the vibrator, the defect and breakage of the vibrator can be promptly detected, and the downtime of the EUV light source device can be made shorter.

Also in the embodiment, the vibrator power supply 110 may be controlled based on the amount of displacement of the vibrator measured from plural different directions by providing plural displacement meters.

Figure 7:
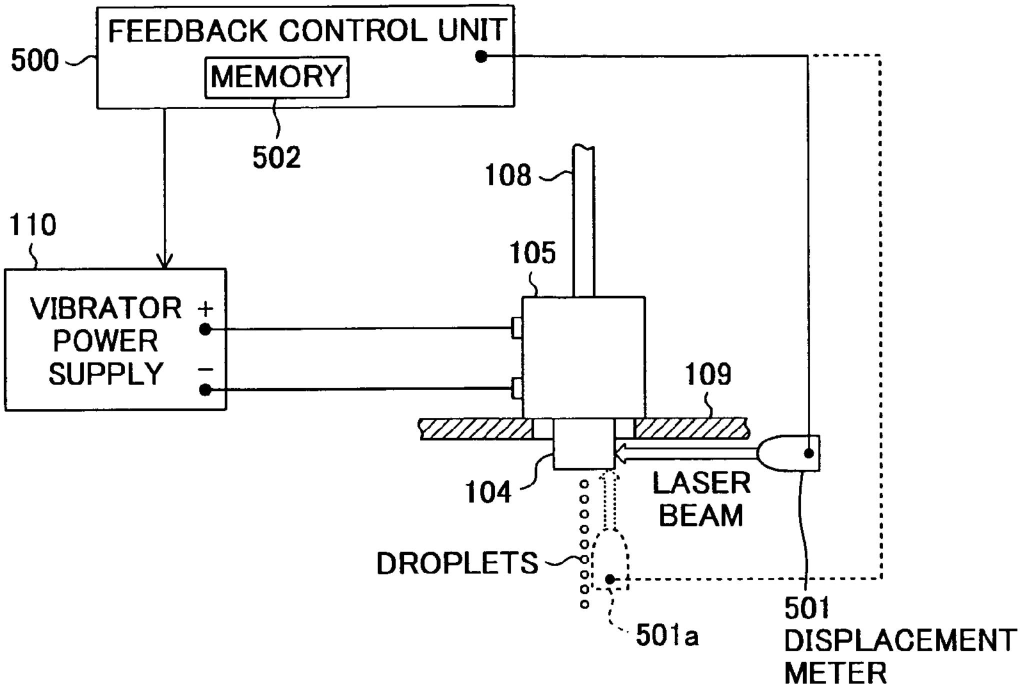
FIG. 7 is a schematic diagram showing a part of the LPP extreme ultra violet light source device according to the fifth embodiment of the present invention.

FIG. 7 is a schematic diagram showing a part of the LPP extreme ultra violet light source device according to the fifth embodiment of the present invention. This LPP EUV light source device has a feedback control unit 500 in place of the feedback control unit 120 shown in FIG. 2, and further has at least one noncontact-type displacement meter 501 as a measuring unit. Other constitution is the same as that of the LPP EUV light source device shown in FIGS. 1 and 2.

The displacement meter 501 is provided for measuring the amount of displacement of the injection nozzle 104. Further, the feedback control unit 500 feedback controls the output voltage of the vibrator power supply 110 based on the amount of displacement measured by the displacement meter 501 such that the vibrator 105 vibrates with desired amplitude (amplitude in a range in which uniform droplets can be formed). For example, the feedback control unit 500 has a nonvolatile memory 502 in which a database representing amplitude ranges of the vibration, which enable formation of uniform droplets and which are set according to frequencies of the drive signal, has been stored. And, the feedback control unit 500 controls the vibrator power supply 110 based on the database such that the measured amplitude of the vibration of the injection nozzle 104 falls within one of the above amplitude ranges.

As the noncontact-type displacement meter 501, for example, a laser Doppler displacement meter or the like may be used. The irradiation direction of laser beam is not limited to the direction shown in FIG. 7. For example, in the case where the injection nozzle 104 vibrates in horizontal directions of FIG. 7 according to the vibration direction of the vibrator 105, the displacement meter 501 is desirably disposed such that a laser beam is irradiated perpendicularly to the side of the vibrator 105. Further, in the case where the injection nozzle 104 vibrates in vertical directions of FIG. 7 according to the vibration direction of the vibrator 105, the displacement meter is desirably disposed such that a laser beam is irradiated perpendicularly to the lower part (e.g., in the position of the displacement meter 501*a*) of the injection nozzle 104. It is not necessary to limit the irradiation position and irradiation direction of laser beam to the positions that have been described above, but important to irradiate the laser beam from a direction in which the injection nozzle amplitude can be measured correctly to an appropriate position.

According to the embodiment, since the injection nozzle amplitude itself is directly monitored, variation in the injection nozzle amplitude caused by variation in the voltage between terminals generated when the frequency of the drive signal is changed can be corrected more precisely. Thereby, the vibrator can be vibrated with appropriate amplitude according to the frequency, and uniform droplets can be formed at each frequency. Further, since the displacement of the injection nozzle is no longer affected by the contact with the displacement meter using the noncontact displacement meter, vibration of the injection nozzle can be controlled more precisely. In addition, by monitoring the amplitude of the injection nozzle, the defect and breakage of the vibrator can be promptly detected, and the downtime of the EUV light source device can be made shorter.

Also in the embodiment, the vibrator power supply 110 may be controlled based on the amount of displacement of the injection nozzle measured from plural different directions by providing plural displacement meters.

Figure 8:
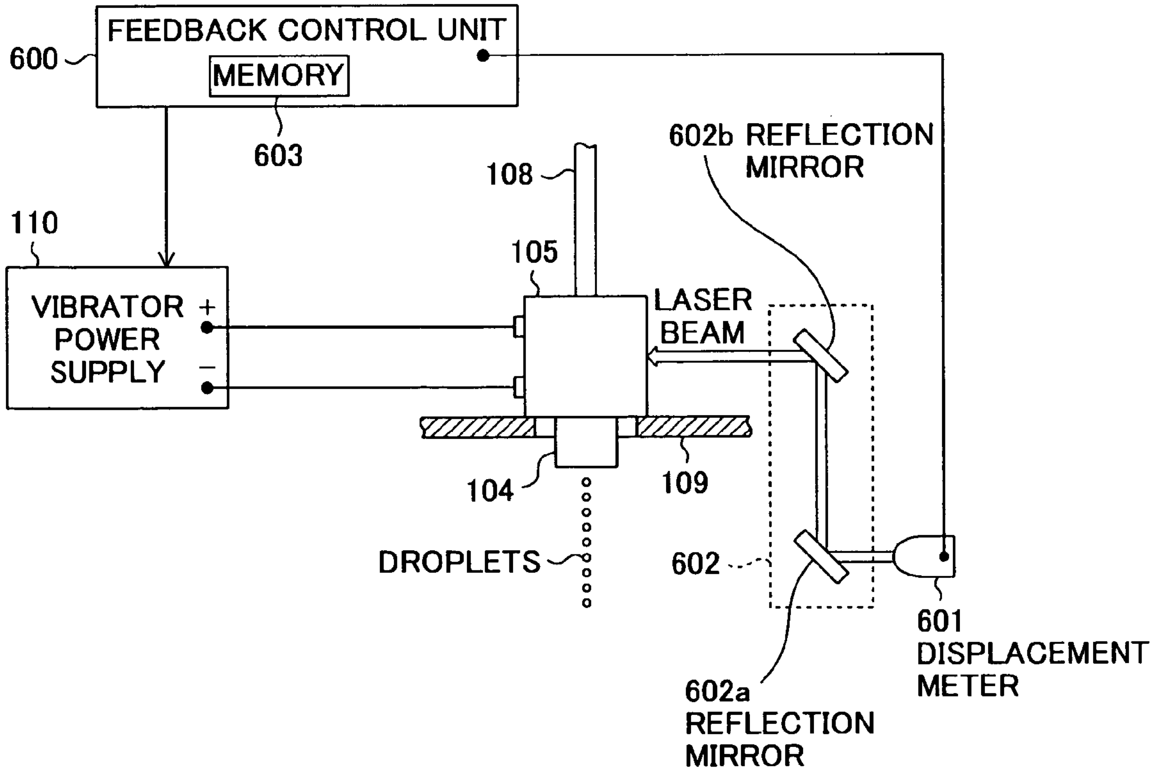
FIG. 8 is a schematic diagram showing a part of the LPP extreme ultra violet light source device according to the sixth embodiment of the present invention.
Figure 9:
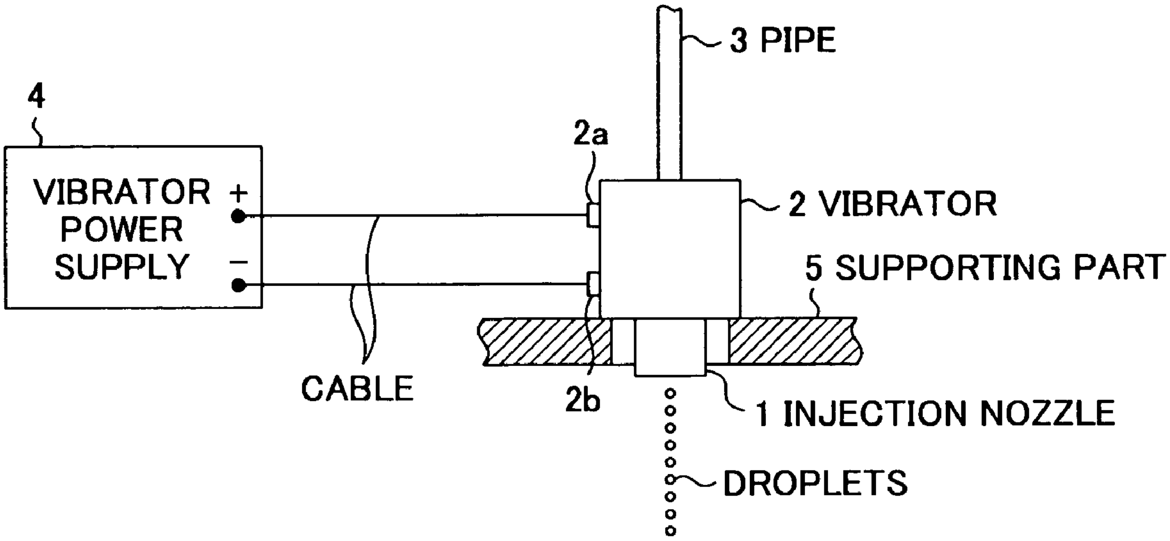
FIG.9 PRIOR ART
FIG. 9 is a schematic diagram showing a general constitution of an injection nozzle for droplet generation.

FIG. 8 is a schematic diagram showing a part of the LPP extreme ultra violet light source device according to the sixth embodiment of the present invention. This LPP EUV light source device has a feedback control unit 600 in place of the feedback control unit 120 shown in FIG. 2, and further has at least one noncontact-type displacement meter 601 as a measuring unit and at least one set of optical system 602. Other constitution is the same as that of the LPP EUV light source device shown in FIGS. 1 and 2.

The displacement meter 601 is provided for measuring the amount of displacement of the vibrator 105 or the injection nozzle 104. As the noncontact-type displacement meter 601, for example, a laser Doppler displacement meter or the like may be used. Further, the optical system 602 includes optical elements 602*a* and 602*b* such as reflection mirrors, and guides the laser beam outputted from the displacement meter 601 to a predetermined position of the vibrator 105 or the injection nozzle 104. The feedback control unit 600 feedback controls the output voltage of the vibrator power supply 110 based on the amount of displacement measured by the displacement meter 601 such that the vibrator 105 or the injection nozzle 104 vibrates with desired amplitude (amplitude in a range in which uniform droplets can be formed). For example, the feedback control unit 600 has a nonvolatile memory 603 in which a database representing amplitude ranges of the vibration, which enable formation of uniform droplets and which are set according to frequencies of the drive signal, has been stored. And, the feedback control unit 600 controls the vibrator power supply 110 based on the database such that the measured amplitude of the vibration of the vibrator 105 or the injection nozzle 104 falls within one of the above amplitude ranges.

Here, since the peripheral structure of the vibrator and the injection nozzle is highly complex in a typical LPP EUV light source device, it is difficult to irradiate a laser beam outputted from the laser Doppler displacement meter directly to a desired position of the vibrator and the injection nozzle. Accordingly, the optical system 602 is provided in the embodiment. For example, since the displacement meter 601 (FIG. 8) is located outside of the EUV generation chamber 100 (FIG. 1) of the EUV light source device, and the laser outputted therefrom can be irradiated to a desired position of the vibrator 105 or the injection nozzle 104, the more precise amount of displacement can be measured. Further, since the degree of freedom of attachment position of the displacement meter 601, the downtime of the EUV light source device at the time of maintenance or the like can be made shorter.

Also in the embodiment, the vibrator power supply 110 may be controlled based on the amount of displacement of the injection nozzle measured from plural different directions by providing plural displacement meters and plural sets of optical systems.

The present invention can be utilized in an LPP EUV light source device used in exposure equipment of the like.

The invention claimed is:

1. An extreme ultra violet light source device for generating extreme ultra violet light by irradiating a laser beam to droplets as a target formed by a continuous jet method, said device comprising:

a chamber in which the extreme ultra violet light is generated;

an injection nozzle that injects a target material into said chamber;

a vibrator that has two terminals and vibrates to provide vibration to said injection nozzle when a drive signal is applied between the two terminals via a cable;

a voltage generator that generates the drive signal to be applied between the two terminals of said vibrator;

a controller that monitors a voltage between the two terminals of said vibrator and feedback controls said voltage generator such that an amplitude of the monitored voltage falls within a predetermined range; and a laser source that generates a laser beam to be irradiated to the target material injected from said injection nozzle.

2. The extreme ultra violet light source device according to claim 1, wherein said controller has a database representing amplitude ranges of the voltage, which enable formation of uniform droplets and which are set according to frequencies of the drive signal, and feedback controls said voltage generator based on the database such that the amplitude of the monitored voltage falls within one of the amplitude ranges.

3. The extreme ultra violet light source device according to claim 2, wherein an upper limit of each of said amplitude ranges of the voltage, which enable formation of uniform droplets, is not larger than ten times a lower limit of the amplitude range.

4. An extreme ultra violet light source device for generating extreme ultra violet light by irradiating a laser beam to droplets as a target formed by a continuous jet method, said device comprising:

a chamber in which the extreme ultra violet light is generated;

an injection nozzle that injects a target material into said chamber;

a vibrator that has two terminals and vibrates to provide vibration to said injection nozzle when a drive signal is applied between the two terminals via a cable;

a voltage generator that generates the drive signal to be applied between the two terminals of said vibrator;

a measuring unit that measures an amount of displacement of said injection nozzle or said vibrator;

a controller that feedback controls said voltage generator based on the amount of the displacement measured by said measuring unit such that an amplitude of the vibration provided to said injection nozzle falls within a predetermined range; and a laser source that generates a laser beam to be irradiated to the target material injected from said injection nozzle.

5. The extreme ultra violet light source device according to claim 4, wherein said controller has a database representing amplitude ranges of the vibration, which enable formation of uniform droplets and which are set according to frequencies of the drive signal, and feedback controls said voltage generator based on the database such that the amplitude of the vibration provided to said injection nozzle falls within the predetermined range.

6. The extreme ultra violet light source device according to claim 5, wherein an upper limit of each of said amplitude ranges of the vibration, which enable formation of uniform droplets, is not larger than ten times a lower limit of the amplitude range.

7. The extreme ultra violet light source device according to claim 4, wherein said measuring unit includes a contact-type displacement measuring unit.

8. The extreme ultra violet light source device according to claim 4, wherein said measuring unit includes a noncontact-type displacement measuring unit.

9. The extreme ultra violet light source device according to claim 8, wherein said measuring unit includes a laser Doppler displacement measuring unit.

10. The extreme ultra violet light source device according to claim 9, further comprising:

an optical system that guides a laser beam outputted from said measuring unit to a measurement point in said injection nozzle or said vibrator.

* * * * *